(12) United States Patent
Seo et al.

(10) Patent No.: US 12,517,609 B2
(45) Date of Patent: Jan. 6, 2026

(54) FINGERPRINT SENSOR PACKAGE AND SMART CARD INCLUDING THE SAME

(71) Applicant: Samsung Electronics Co., Ltd., Suwon-si (KR)

(72) Inventors: Yoonseok Seo, Suwon-si (KR); Yechung Chung, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 18/937,240

(22) Filed: Nov. 5, 2024

(65) Prior Publication Data

US 2025/0165093 A1 May 22, 2025

(30) Foreign Application Priority Data

Nov. 20, 2023 (KR) .......................... 10-2023-0161444

(51) Int. Cl.
*G06F 3/041* (2006.01)
*G06F 3/044* (2006.01)
*G06K 19/07* (2006.01)
*G06V 40/13* (2022.01)

(52) U.S. Cl.
CPC .......... *G06F 3/04164* (2019.05); *G06F 3/044* (2013.01); *G06K 19/0718* (2013.01); *G06V 40/1306* (2022.01)

(58) Field of Classification Search
None
See application file for complete search history.

(56) References Cited

U.S. PATENT DOCUMENTS

| | | | |
|---|---|---|---|
| 8,397,988 B1 | 3/2013 | Zuili | |
| 10,783,337 B2 | 9/2020 | Mosteller | |
| 11,397,883 B2* | 7/2022 | Lee | .............. G06K 19/0718 |
| 11,610,429 B2 | 3/2023 | Lundberg et al. | |
| 2022/0207317 A1 | 6/2022 | Fabrizio et al. | |
| 2022/0216137 A1* | 7/2022 | Mathieu | ............ H01L 23/49838 |
| 2022/0293507 A1* | 9/2022 | Lim | .................... H01L 23/3121 |

FOREIGN PATENT DOCUMENTS

| | | |
|---|---|---|
| CN | 110942997 B | 8/2021 |
| KR | 10-2002356 B1 | 7/2019 |
| KR | 10-2019-0091705 A | 8/2019 |

* cited by examiner

*Primary Examiner* — Stephen T. Reed
(74) *Attorney, Agent, or Firm* — Fish & Richardson P.C.

(57) ABSTRACT

Provided is a fingerprint sensor package including an anisotropic conductive film including a conductive ball.

20 Claims, 18 Drawing Sheets

FINGERPRINT SENSOR PACKAGE AND SMART CARD INCLUDING THE SAME

CROSS-REFERENCE TO RELATED APPLICATION

This application is based on and claims priority under 35 U.S.C. § 119 to Korean Patent Application No. 10-2023-0161444, filed on Nov. 20, 2023, in the Korean Intellectual Property Office, the disclosure of which is incorporated by reference herein in its entirety.

BACKGROUND

The inventive concepts relate to fingerprint sensor packages and smart cards including the same.

Fingerprint recognition technology is used to prevent various security incidents by recognizing a user's fingerprint and allowing the user to undergo a registration and authentication procedure. In particular, fingerprint recognition technology is applied to individual and organizational network protection, protection of various kinds of content and data, secure access to financial information, and the like. Fingerprint sensors acquire users' fingerprint information using an optical method, a capacitive method, an ultrasonic method, a heat detection method, or the like. The recent trend in the fingerprint sensor industry is to manufacture compact and thin products at low cost. Accordingly, fingerprint sensor packages are required to have reduced overall size and height while maintaining the reliability and sensitivity of acquiring fingerprint information and satisfying economic feasibility.

SUMMARY

The inventive concepts provide fingerprint sensor packages with increased space efficiency and smart cards including the same.

The inventive concepts are not limited to what is mentioned above and will be clearly understood by those skilled in the art from the descriptions below.

According to an example embodiment of the inventive concepts, a fingerprint sensor package may include a first substrate including first bonding pads and an external connection pad, a second substrate attached to the first substrate, the second substrate including a plurality of first sensing patterns, a plurality of second sensing patterns, and second bonding pads, the plurality of first sensing patterns being apart from each other in a first direction and each extending in a second direction that crosses the first direction, and the plurality of second sensing patterns being apart from each other in the second direction and each extending in the first direction, conductive wires electrically connecting the first bonding pads to the second bonding pads, a controller chip connected to the second substrate, and a molding layer covering the controller chip and the second substrate and in contact with the first bonding pads, the second bonding pads, and the conductive wires, wherein the external connection pad includes an outer pattern having a bar shape in a plan view and an inner pattern inside the bar shape, and the external connection pad is in contact with an anisotropic conductive film including a conductive ball.

According to an example embodiment of the inventive concepts, a fingerprint sensor package may include a first substrate including a core insulating layer including a first surface and a second surface opposite to the first surface, a ground bezel on the first surface of the core insulating layer, an adhesive layer between the core insulating layer and the ground bezel, first bonding pads on the second surface of the core insulating layer, and an external connection pad between an edge of the second surface of the core insulating layer and the first bonding pads, a second substrate attached to the second surface of the core insulating layer, the second substrate including a plurality of first sensing patterns, a plurality of second sensing patterns, and second bonding pads, the plurality of first sensing patterns being apart from each other in a first direction and each extending in a second direction that crosses the first direction, and the plurality of second sensing patterns being apart from each other in the second direction and each extending in the first direction, conductive wires electrically connecting the first bonding pads to the second bonding pads, a controller chip connected to the second substrate, and a molding layer covering the second substrate and the controller chip and in contact with the first bonding pads, the second bonding pads, and the conductive wires, wherein the molding layer laterally extends on the second surface of the core insulating layer from a side surface of the second substrate to a boundary between the first bonding pads and the external connection pad, the plurality of first sensing patterns are apart from the plurality of second sensing patterns in a third direction that is perpendicular to the first direction and the second direction, the plurality of first sensing patterns and the plurality of second sensing patterns form a plurality of capacitors, and the external connection pad includes an outer pattern and an inner pattern and is in contact with an anisotropic conductive film including a conductive ball.

According to an example embodiment of the inventive concepts, a smart card may include a card body including a groove portion and a connection pad, a security chip in the card body, and a fingerprint sensor package configured to sense a user's fingerprint and transmit a signal corresponding to a sensing result to the security chip, wherein the fingerprint sensor package includes a first substrate including a core insulating layer including a first surface and a second surface opposite to the first surface, first bonding pads on the second surface of the core insulating layer, and an external connection pad bonded to the connection pad of the card body, a second substrate attached to the second surface of the core insulating layer, the second substrate including a plurality of first sensing patterns, a plurality of second sensing patterns, and second bonding pads, the plurality of first sensing patterns being apart from each other in a first direction and each extending in a second direction that crosses the first direction, and the plurality of second sensing patterns being apart from each other in the second direction and each extending in the first direction, conductive wires extending between the first bonding pads and the second bonding pads, a controller chip connected to the second substrate, and a molding layer covering the second substrate and the controller chip and in contact with the first bonding pads, the second bonding pads, and the conductive wires, and wherein the external connection pad includes an outer pattern and an inner pattern and is in contact with an anisotropic conductive film including a conductive ball.

BRIEF DESCRIPTION OF THE DRAWINGS

Example embodiments will be more clearly understood from the following detailed description taken in conjunction with the accompanying drawings in which.

DETAILED DESCRIPTION

Figure 1:
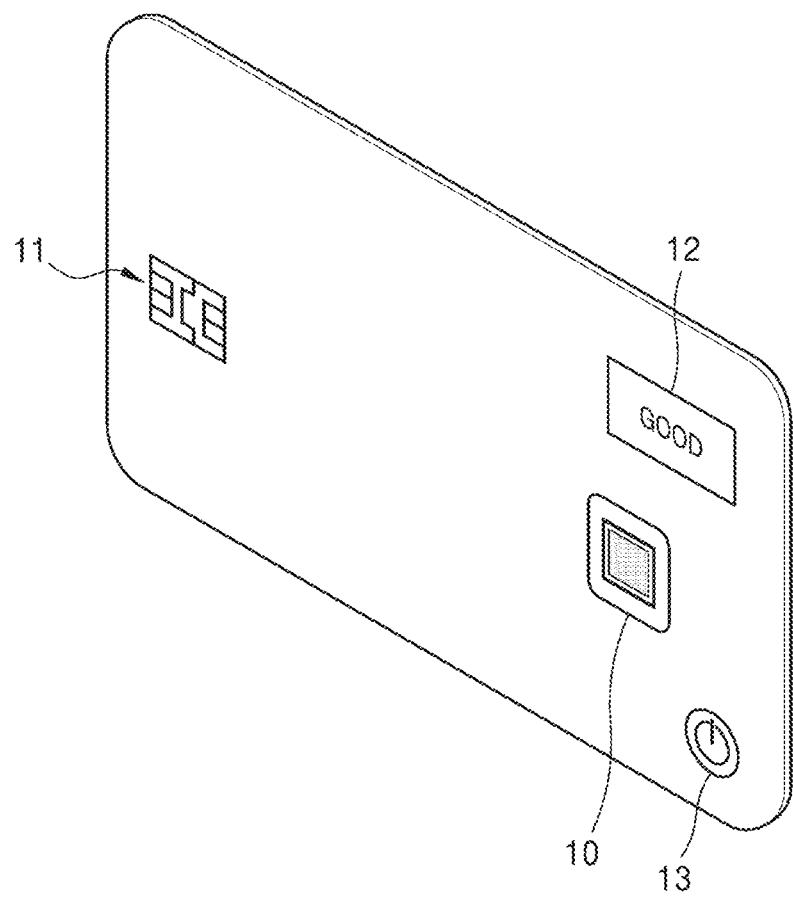
FIG. 1 is a schematic perspective view of a smart card according to an example embodiment.

Hereinafter, some example embodiments will be described in detail with reference to the accompanying drawings. In the drawings, like reference characters denote like elements, and redundant descriptions thereof will be omitted.

While the term "same," "equal" or "identical" is used in description of example embodiments, it should be understood that some imprecisions may exist. Thus, when one element is referred to as being the same as another element, it should be understood that an element or a value is the same as another element within a desired manufacturing or operational tolerance range (e.g., ±10%).

When the term "about," "substantially" or "approximately" is used in this specification in connection with a numerical value, it is intended that the associated numerical value includes a manufacturing or operational tolerance (e.g., ±10%) around the stated numerical value. Moreover, when the word "about," "substantially" or "approximately" is used in connection with geometric shapes, it is intended that precision of the geometric shape is not required but that latitude for the shape is within the scope of the disclosure. Further, regardless of whether numerical values or shapes are modified as "about" or "substantially," it will be understood that these values and shapes should be construed as including a manufacturing or operational tolerance (e.g., ±10%) around the stated numerical values or shapes.

As the inventive concepts allow for various changes and numerous example embodiments, specific example embodiments will be illustrated in the drawings and described in detail in the written description. However, this is not intended to limit example embodiments to particular modes of practice, and it is to be appreciated that all changes, equivalents, and substitutes that do not depart from the spirit and technical scope of the inventive concepts are encompassed in example embodiments. In the description of the disclosed example embodiments, certain detailed descriptions of the related art are omitted when it is deemed that they may unnecessarily obscure the essence of the inventive concepts.

FIG. 1 is a schematic perspective view of a smart card 1 according to an example embodiment.

Referring to FIG. 1, the smart card 1 may include a fingerprint sensor package 10, a security chip 11, a display 12, and a power button 13.

Information, such as a card number identifier, an expiration date identifier, or a user name, which are generally displayed on a credit card or debit card, may be stored on the smart card 1. The smart card 1 may further include a radio frequency (RF) chip.

When a user contacts a fingerprint sensor via the tip of a finger, the fingerprint sensor package 10 may recognize the user's fingerprint. The fingerprint sensor package 10 may compare the recognized fingerprint with a registered fingerprint and determine whether the recognized fingerprint matches the registered fingerprint. The fingerprint sensor package 10 may operate after the smart card 1 is switched on.

The security chip 11 may store encrypted financial information. When the recognized fingerprint matches the registered fingerprint, the security chip 11 may grant payment authority to the user of the smart card 1. For example, when the security chip 11 grants payment authority to a user based on the recognition result of the fingerprint sensor package 10, the smart card 1 may reduce or prevent financial incidents caused by theft or loss.

The display 12 may display match or mismatch between the recognized fingerprint and the registered fingerprint, on or off state of the smart card 1, or the like. The display 12 may display letters, numbers, special symbols, or the like, and in some cases, may further include a light emitting unit. However, the display 12 may be omitted according to the type of smart card 1.

The power button 13 may be used to turn on or off the smart card 1. The smart card 1 in an off-state may be switched on by manipulating the power button 13. The smart card 1 in an on-state may be switched off by manipulating the power button 13. After a set time elapses since the smart card 1 is switched on, the smart card 1 may be automatically switched off. However, the power button 13 may be omitted according to the type of smart card 1.

According to the current example embodiment, the smart card 1 may include the fingerprint sensor package 10 and have the same level of thickness as typical credit cards or check cards, thereby providing a high level of user experience. The cross-section of the smart card 1 of the current example embodiment may be substantially the same as or similar to that of FIG. 4F.

Figure 2A:
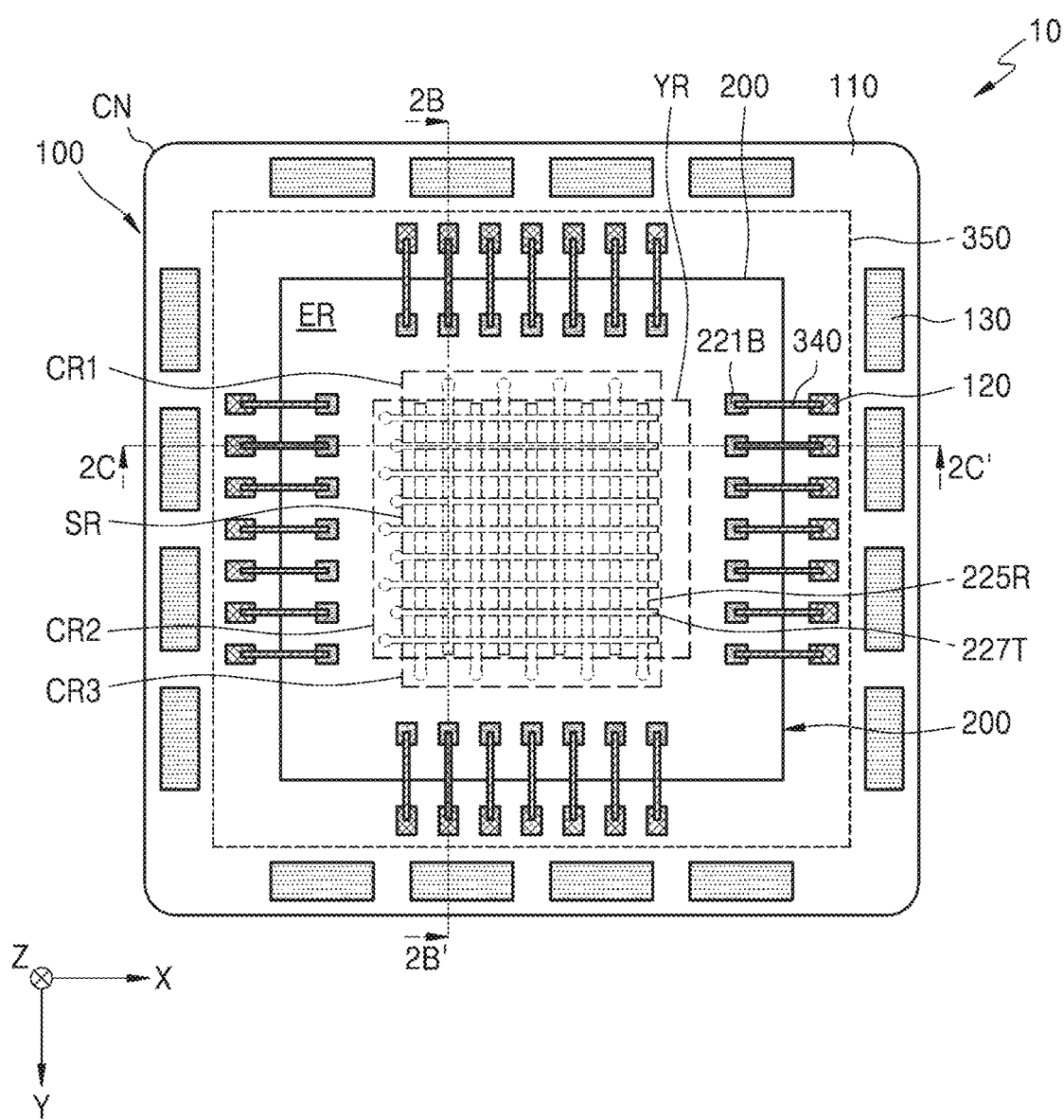
FIG. 2A is a schematic bottom view illustrating a layout according to a partial configuration of a fingerprint sensor package, according to an example embodiment.
Figure 2B:
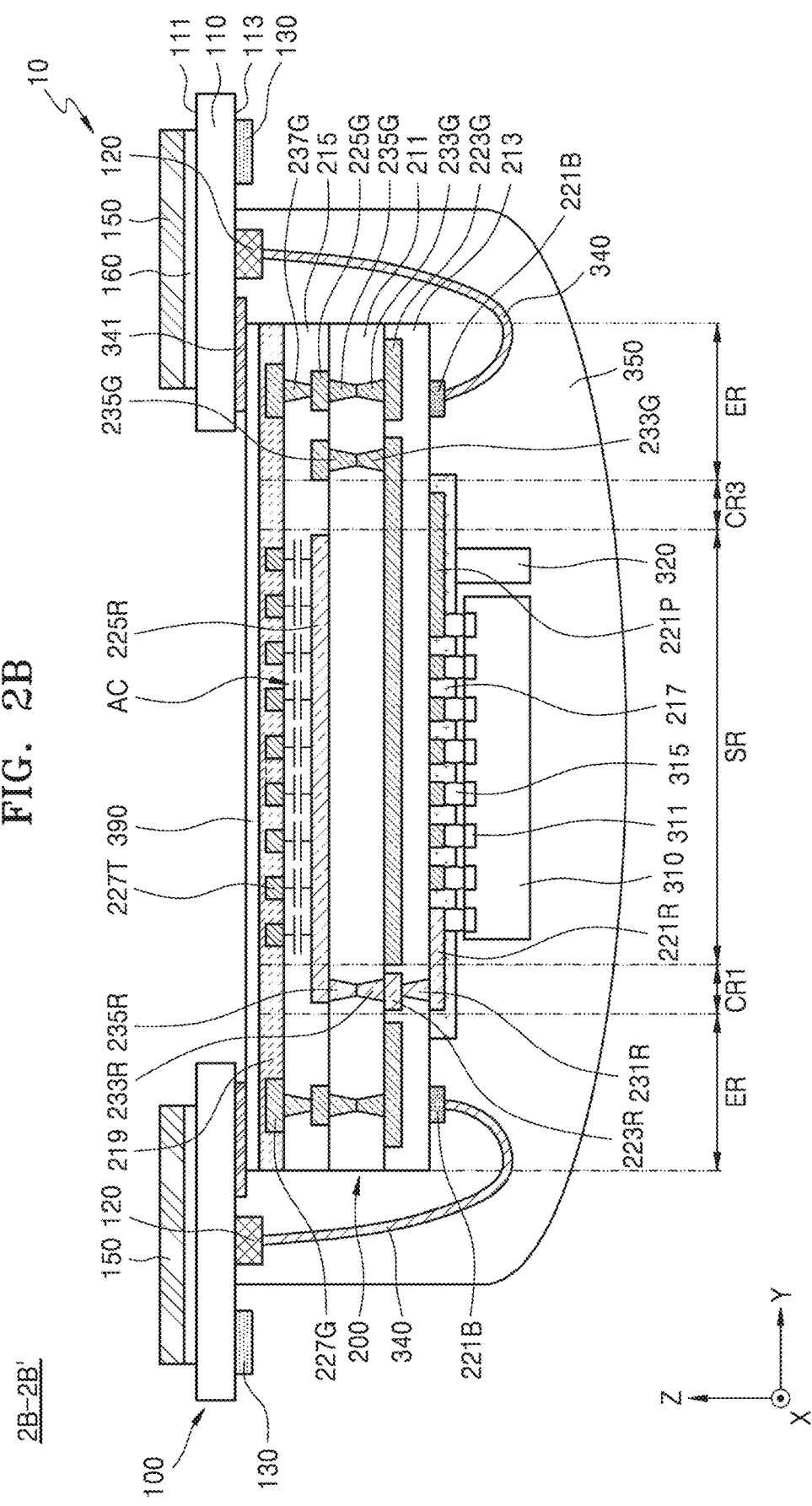
FIG. 2B is a cross-sectional view taken along line 2B-2B' in FIG. 2A.
Figure 2C:
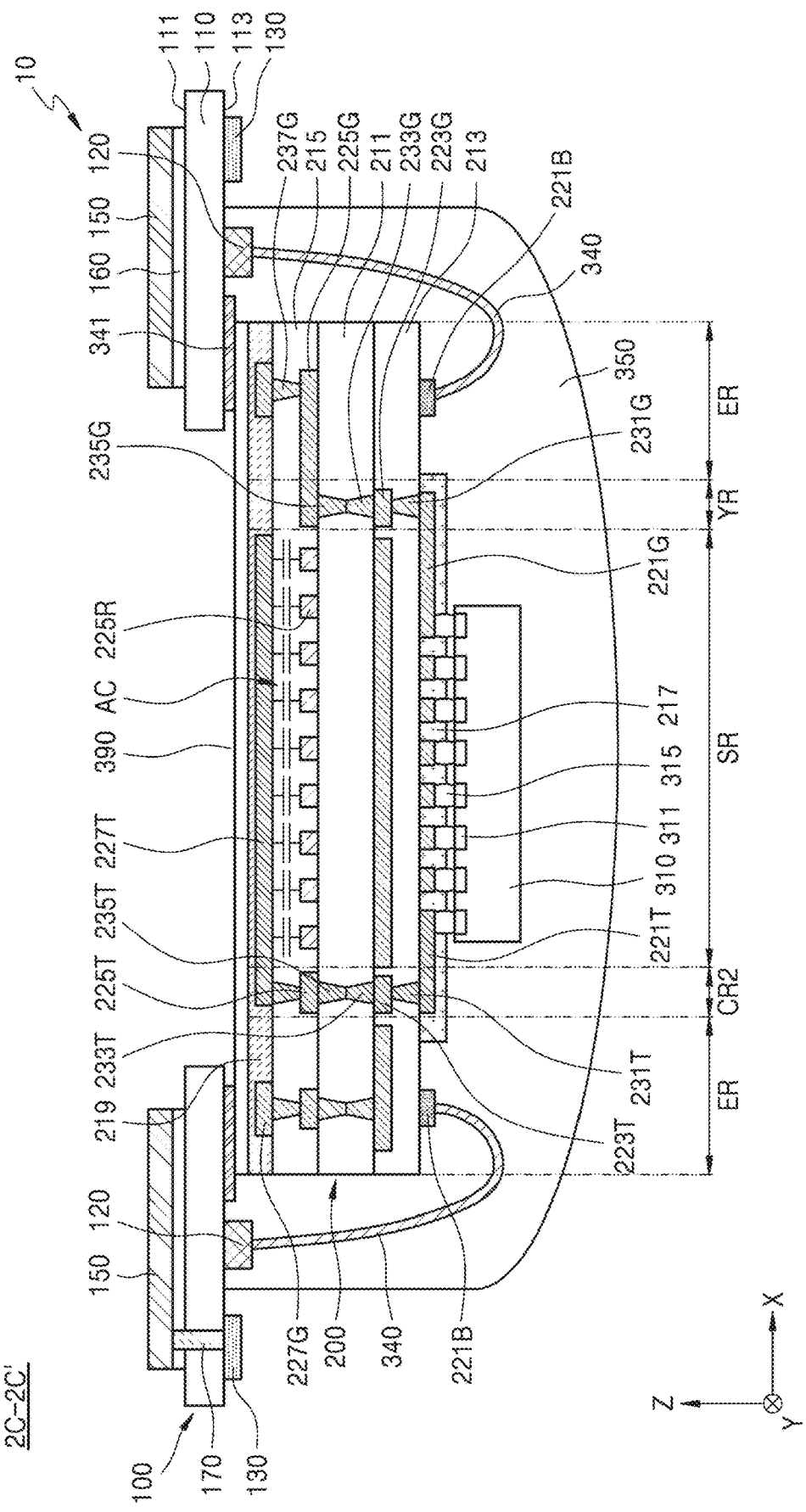
FIG. 2C is a cross-sectional view taken along line 2C-2C' in FIG. 2A.

FIGS. 2A to 2C are diagrams illustrating the fingerprint sensor package 10 according to an example embodiment.

In detail, FIG. 2A is a schematic bottom view illustrating a layout according to a partial configuration of the fingerprint sensor package 10. FIG. 2B is a cross-sectional view taken along line 2B-2B' in FIG. 2A. FIG. 2C is a cross-sectional view taken along line 2C-2C' in FIG. 2A.

Referring to FIGS. 2A to 2C, the fingerprint sensor package 10 may include a first substrate 100, a second substrate 200, a controller chip 310, a passive element 320, and a molding layer 350.

The first substrate 100 may include a core insulating layer 110, first bonding pads 120, external connection pads 130, a ground bezel 150, and an adhesive layer 160.

The first substrate 100 may include a printed circuit board (PCB). In some example embodiments, the first substrate 100 may include a flexible PCB (FPCB) that is flexible enough to be bent. In some example embodiments, the first substrate 100 may include a rigid PCB.

The core insulating layer 110 may have substantially a film or plate shape and include a first surface 111 and a second surface 113 opposite to the first surface 111. Here, a direction that is parallel with a pair of edges of the core insulating layer 110 is defined as a first direction (the X direction), a direction that is parallel with the other pair of edges of the core insulating layer 110 is defined as a second direction (the Y direction), and a direction that is perpendicular to the main surface (the first surface 111 or the second surface 113) of the core insulating layer 110 is defined as a third direction (the Z direction).

The core insulating layer 110 may include an insulating material. For example, the core insulating layer 110 may correspond to a flexible film including polyimide. For example, the core insulating layer 110 may include epoxy resin or synthetic resin (e.g., acrylic resin, polyether nitrile, polyether sulfone, polyethylene terephthalate, or polyethylene naphthalate).

The second surface 113 of the core insulating layer 110 may include a mount region on which the second substrate 200 is mounted. The first bonding pads 120 may be arranged around the mount region of the second surface 113 of the core insulating layer 110. For example, the first bonding pads 120 may be arranged along at least one edge of the mount region of the core insulating layer 110. The first bonding pads 120 may be connected to conductive wires 340, respectively, and electrically connected to second bonding pads 221B of the second substrate 200 through the conductive wires 340.

The external connection pads 130 may be on the second surface 113 of the core insulating layer 110. The external connection pads 130 may be adjacent to an edge of the second surface 113 of the core insulating layer 110 and arranged along the edge of the second surface 113 of the core insulating layer 110. The external connection pads 130 may be closer to the edge of the second surface 113 of the core insulating layer 110 than the first bonding pads 120. In other words, the distance between the edge of the second surface 113 of the core insulating layer 110 and each of the external connection pads 130 may be less than the distance between the edge of the second surface 113 of the core insulating layer 110 and each of the external connection pads 130. Each of the external connection pads 130 may be electrically and physically connected to an external device (e.g., a card body 500 in FIG. 4E). Each external connection pad 130 may be electrically connected to first bonding pads 120 through a conductive pattern of the first substrate 100.

For example, the first bonding pads 120 and the external connection pads 130 may include at least one selected from copper (Cu), aluminum (Al), nickel (Ni), silver (Ag), gold (Au), platinum (Pt), tin (Sn), lead (Pb), titanium (Ti), chrome (Cr), palladium (Pd), indium (In), zinc (Zn), carbon (C), and an alloy thereof.

The ground bezel 150 may be on the first surface 111 of the core insulating layer 110. The ground bezel 150 may function to reduce sensing noise. For example, the ground bezel 150 may include a conductive material such as metal (e.g., Cu or Al).

The ground bezel 150 may be electrically grounded. In some example embodiments, the ground bezel 150 may be configured to receive a reference potential through a conductive via 170, which penetrates through the core insulating layer 110 and the adhesive layer 160. The conductive via 170 may be configured to electrically connect the ground bezel 150 to an external connection pad 130 and may be used as an electrical path for delivering the reference potential to the ground bezel 150.

The adhesive layer 160 may be between the first surface 111 of the core insulating layer 110 and the ground bezel 150. The adhesive layer 160 may attach the ground bezel 150 to the core insulating layer 110. For example, the adhesive layer 160 may include an insulating adhesive.

In some example embodiments, the first substrate 100 may have corners CN each having a round shape. Each corner CN of the first substrate 100 may have a round shape in order to efficiently reduce or prevent cracks from occurring in the corner CN while a first panel substrate (100P in FIGS. 4B-4D) is being cut using a punching machine (PM in FIG. 4D). However, the inventive concepts are not limited thereto.

The second substrate 200 may be on the first substrate 100. The second substrate 200 may be mounted on the mount region of the second surface 113 of the core insulating layer 110. A substrate adhesive layer 390 may be arranged between the top surface of the second substrate 200 and the second surface 113 of the core insulating layer 110 to attach the second substrate 200 to the core insulating layer 110. The second substrate 200 may be electrically connected to the first substrate 100 through the conductive wires 340.

The second substrate 200 may include a PCB. In some example embodiments, the second substrate 200 may include a rigid substrate. The second substrate 200 may have substantially a rectangular planar shape or a square planar shape. The second substrate 200 may include a top surface and a bottom surface opposite to the top surface. The top surface of the second substrate 200 may be in contact with the first substrate 100, and components including the controller chip 310 may be mounted on the bottom surface of the second substrate 200.

The second substrate 200 may include a base layer 211, a lower insulating layer 213 on the bottom surface of the base layer 211, an upper insulating layer 215 on the top surface of the base layer 211, a lower protective layer 217 on the bottom surface of the lower insulating layer 213, and an upper protective layer 219 on the top surface of the upper insulating layer 215.

The second substrate 200 may correspond to a multi-layer PCB including a plurality of conductive layers. The second substrate 200 may include conductive layers at different vertical levels and conductive vias electrically connecting the conductive layers to each other. The conductive layers and conductive vias may include at least one selected from Cu, Al, Ni, Ag, Au, Pt, Sn, Pb, Ti, Cr, Pd, In, Zn, C, and an alloy thereof.

For example, the second substrate 200 may sequentially include toward the first substrate 100 a first conductive layer (e.g., 221B, 221G, 221R, 221T, and 221P), a second conductive layer (e.g., 223G, 223R, and 223T), a third conductive layer (e.g., 225G, 225R, and 225T), and a fourth conductive layer (e.g., 227G and 227T). The first conductive layer (221B, 221G, 221R, 221T, and 221P) may be on the bottom surface of the lower insulating layer 213. The second conductive layer (223G, 223R, and 223T) may be on the bottom surface of the base layer 211. The third conductive layer (225G, 225R, and 225T) may be on the top surface of the base layer 211. The fourth conductive layer (227G and 227T) may be on the top surface of the upper insulating layer 215.

The first conductive layer may include a second bonding pad 221B, a first-1 sensing pad 221R, a first-2 sensing pad 221T, a first ground pattern 221G, and a power pattern 221P. The second conductive layer may include a second-1 sensing pad 223R, a second-2 sensing pad 223T, and a second ground pattern 223G. The third conductive layer may include a third-1 sensing pad 225R, a third-2 sensing pad 225T, and a third ground pattern 225G. The fourth conductive layer may include a second sensing pattern 227T and a fourth ground pattern 227G.

The second substrate 200 may also include first conductive vias (e.g., 231G, 231R, and 231T) for electrical connection between the first conductive layer (221B, 221G, 221R, 221T, and 221P) and the second conductive layer (223G, 223R, and 223T), second conductive vias (e.g., 233G, 233R, and 233T) and third conductive vias (e.g., 235G, 235R, and 235T) for electrical connection between the second conductive layer (223G, 223R, and 223T) and the third conductive layer (225G, 225R, and 225T), and fourth conductive vias (e.g., 237G) for electrical connection between the third conductive layer (225G, 225R, and 225T) and the fourth conductive layer (227G and 227T). The first conductive vias (231G, 231R, and 231T) may at least partially penetrate through the lower insulating layer 213. The second conductive vias (233G, 233R, and 233T) may partially penetrate through the base layer 211. The third conductive vias (235G, 235R, and 235T) may partially penetrate through the base layer 211. The fourth conductive vias (237G) may at least partially penetrate through the upper insulating layer 215.

The first conductive vias may include a first-1 sensing via 231R electrically connecting the first-1 sensing pad 221R to the second-1 sensing pad 223R, a first-2 sensing via 231T electrically connecting the first-2 sensing pad 221T to the second-2 sensing pad 223T, and a first ground via 231G electrically connecting the first ground pattern 221G to the second ground pattern 223G. In embodiments, the first conductive vias (231G, 231R, and 231T) may each have a tapered structure having a horizontal width decreasing toward the base layer 211.

The second conductive vias may include a second-1 sensing via 233R electrically connecting the second-1 sensing pad 223R to the first sensing pattern 225R, a second-2 sensing via 233T electrically connecting the second-2 sensing pad 223T to the third-2 sensing pad 225T, and a second ground via 233G electrically connecting the second ground pattern 223G to the third ground pattern 225G.

The second conductive vias (233G, 233R, and 233T) may be in contact with the second conductive layer (223G, 223R, and 223T). The third conductive vias (235G, 235R, and 235T) may be in contact with the third conductive layer (225G, 225R, and 225T). The second conductive vias (233G, 233R, and 233T) may be in contact with the third conductive vias (235G, 235R, and 235T), respectively. In detail, the second-1 sensing pad 223R and the first sensing pattern 225R may be electrically connected to each other by the second-1 sensing via 233R and a third-1 sensing via 235R that are vertically connected to each other. The second-2 sensing pad 223T and the third-2 sensing pad 225T may be electrically connected to each other by the second-2 sensing via 233T and a third-2 sensing via 235T that are vertically connected to each other. The second ground pattern 223G and the third ground pattern 225G may be electrically connected to each other by the second ground via 233G and a third ground via 235G that are vertically connected to each other.

In some example embodiments, the second conductive vias (233G, 233R, and 233T) and the third conductive vias (235G, 235R, and 235T) may each have a tapered structure having a horizontal width decreasing toward the center of the base layer 211 in the thickness direction of the base layer 211. In some example embodiments, the second conductive vias (233G, 233R, and 233T) and the third conductive vias (235G, 235R, and 235T) may have a minimum horizontal width at the contact surface therebetween.

In some example embodiments, the fourth conductive vias (237G) may have a tapered structure having a horizontal width decreasing toward the base layer 211.

The second substrate 200 may include a sensing region SR, a first contact region CR1, a second contact region CR2, a third contact region CR3, a wiring region YR, and a peripheral region ER. In detail, the first sensing pattern 225R for fingerprint recognition may be arranged in the sensing region SR. The first-1 sensing via 231R, the second-1 sensing via 233R, and the third-1 sensing via 235R, for connection between the first sensing pattern 225R and the controller chip 310, may be arranged in each of the first contact region CR1 and the third contact region CR3. The first-2 sensing via 231T, the second-2 sensing via 233T, and the third-2 sensing via 235T for connection between the second sensing pattern 227T and the controller chip 310 may be arranged in the second contact region CR2.

The sensing region SR may be in the central portion of the second substrate 200. In some example embodiments, the sensing region SR may have a rectangular or square shape according to a plan view. A plurality of first sensing patterns 225R, which are apart from each other in the first direction (the X direction) and each have a line shape extending in the second direction (the Y direction). A plurality of second sensing patterns 227T, which are apart from each other in the second direction (the Y direction) and each have a line shape extending in the first direction (the X direction), may be arranged in the sensing region SR.

The first contact region CR1 may be located at one end of the sensing region SR in the second direction (the Y direction) and the third contact region CR3 may be located at the other end of the sensing region SR in the second direction (the Y direction). The second contact region CR2 may be located at one end of the sensing region SR in the first direction (the X direction) and the wiring region YR may be located at the other end of the sensing region SR in the first direction (the X direction).

The peripheral region ER may be located in an outer portion of the second substrate 200. The peripheral region ER may surround the sensing region SR according to a plan view. The second bonding pads 221B may be arranged in the peripheral region ER. The first to fourth ground patterns 221G, 223G, 225G, and 227G for providing the reference potential and shielding sensing noise may be arranged in the peripheral region ER.

The first sensing patterns 225R may extend between the sensing region SR and the first contact region CR1 or between the sensing region SR and the third contact region CR3. In other words, the first sensing patterns 225R may extend over the sensing region SR and the first contact region CR1 or over the sensing region SR and the third contact region CR3. The first sensing patterns 225R may each connected to the controller chip 310 through the first-1 sensing via 231R, the second-1 sensing via 233R, and the third-1 sensing via 235R, which are arranged in corresponding ones of the first and third contact regions CR1 and CR3. In the first contact region CR1, a plurality of first-1 sensing vias 231R, a plurality of second-1 sensing vias 233R, and a plurality of third-1 sensing vias 235R may be arranged in the first direction (the X direction). In the third contact region CR3, the first-1 sensing vias 231R, the second-1 sensing vias 233R, and the third-1 sensing vias 235R may be arranged in the first direction (the X direction). Some of the first sensing patterns 225R may each be connected to a first-1 sensing via 231R, a second-1 sensing via 233R, and a third-1 sensing via 235R, which are in the first contact region CR1. The other first sensing patterns 225R may each be connected to a first-1 sensing via 231R, a second-1 sensing via 233R, and a third-1 sensing via 235R, which are in the third contact region CR3. First sensing patterns 225R neighboring each other may be electrically isolated from each other.

The second sensing patterns 227T may extend in the sensing region SR and the second contact region CR2. In other words, the second sensing patterns 227T may extend over the sensing region SR and the second contact region CR2. The second sensing patterns 227T may each be connected to the controller chip 310 through the first-2 sensing via 231T, the second-2 sensing via 233T, and the third-2 sensing via 235T, which are arranged in the second contact region CR2. A plurality of first-2 sensing vias 231T may be arranged to zigzag in the second direction (the Y direction). A plurality of second-2 sensing vias 233T may be arranged to zigzag in the second direction (the Y direction). A plurality of third-2 sensing vias 235T may be arranged to zigzag in the second direction (the Y direction).

The fourth ground pattern 227G may surround the sensing region SR, in which the second sensing patterns 227T are arranged, according to a plan view. The fourth ground pattern 227G may be at the same vertical level as the second sensing patterns 227T and may surround the second sensing patterns 227T according to a plan view. For example, the fourth ground pattern 227G may be on the top surface of the upper insulating layer 215 and may continuously extend along the edge of the sensing region SR, thereby surrounding the second sensing patterns 227T in a plan view.

The base layer 211 may include an insulating material. The base layer 211 may include resin and glass fiber. The resin included in the base layer 211 may include at least one selected from the group consisting of phenol resin, epoxy resin, and polyimide. In some example embodiments, the base layer 211 may include at least one material selected from the group consisting of flame retardant 4 (FR4), tetrafunctional epoxy, polyphenylene ether, epoxy/polyphenylene oxide, Thermount®, bismaleimide triazine (BT), cyanate ester, polyimide, prepreg, Ajinomoto build-up film (ABF), and liquid crystal polymer. In some example embodiments, the base layer 211 may include silicon oxide, silicon nitride, silicon oxynitride, or a combination thereof. The glass fiber included in the base layer 211 may include a reinforcing material obtained by bundling glass filaments obtained by melting and spinning glass material at high temperature. The glass filaments may include a processed ore product containing silica as a main ingredient.

Hereinafter, for convenience of description and understanding, the elements of the second substrate 200 may be sequentially described away from the base layer 211.

The second conductive layer may include second-1 sensing pads 223R, second-2 sensing pads 223T, and a second ground pattern 223G to which a reference potential is applied. The second ground pattern 223G may be arranged in the sensing region SR, the wiring region YR, and the peripheral region ER. A portion of the second ground pattern 223G may overlap a first sensing pattern 225R and the second sensing patterns 227T in the third direction (the Z direction). A portion of the second ground pattern 223G may be between the second sensing patterns 227T and the controller chip 310. Accordingly, the second ground pattern 223G may shield the controller chip 310 from external sensing noise. The second-1 sensing pads 223R may provide a path for electrical connection between the first sensing patterns 225R and the controller chip 310. The second-2 sensing pads 223T may provide a path for electrical connection between the second sensing patterns 227T and the controller chip 310.

The lower insulating layer 213 may be arranged on the bottom surface of the base layer 211 to cover the second conductive layer (223G, 223R, and 223T). The lower insulating layer 213 may electrically isolate the second-1 sensing pads 223R, the second-2 sensing pads 223T, and the second ground pattern 223G from one another.

The third conductive layer may include a third ground pattern 225G to which a reference potential is applied, first sensing patterns 225R for recognizing a user's fingerprint, and third-2 sensing pads 225T. The first sensing patterns 225R may be arranged in the sensing region SR. The third ground pattern 225G may be arranged in the wiring region YR and the peripheral region ER. The third-2 sensing pads 225T may be arranged in the second contact region CR2. The third-2 sensing pads 225T may provide a path for electrical connection between the second sensing patterns 227T and the controller chip 310.

The upper insulating layer 215 may be arranged on the top surface of the base layer 211 to cover the third conductive layer (225G, 225R, and 225T). The upper insulating layer 215 may electrically isolate the first sensing patterns 225R, the third-2 sensing pads 225T, and the third ground pattern 225G.

The lower insulating layer 213 and the upper insulating layer 215 may include different materials. For example, the upper insulating layer 215 may include a material having a permittivity suitable for fingerprint recognition of the fingerprint sensor package 10. However, example embodiments are not limited thereto. The lower insulating layer 213 and the upper insulating layer 215 may include the same material.

The lower insulating layer 213 and the upper insulating layer 215 may each include at least one selected from the group consisting of phenol resin, epoxy resin, and polyimide. In some example embodiments, the lower insulating layer 213 and the upper insulating layer 215 may each include at least one material selected from the group consisting of prepreg, FR4, tetrafunctional epoxy, polyphenylene ether, epoxy/polyphenylene oxide, Thermount®, BT, cyanate ester, polyimide, and liquid crystal polymer.

The fourth conductive layer (227G and 227T) may be arranged on the top surface of the upper insulating layer 215. The fourth conductive layer may include a fourth ground pattern 227G for removing sensing noise and second sensing patterns 227T for recognizing a user's fingerprint. The second sensing patterns 227T may be arranged in the sensing region SR and the fourth ground pattern 227G may be arranged in the peripheral region ER.

The second sensing patterns 227T may be separated from the first sensing patterns 225R by the upper insulating layer 215 in the third direction (the Z direction). In other words, the second sensing patterns 227T may be electrically insulated from the first sensing patterns 225R by the upper insulating layer 215. Accordingly, the first sensing patterns 225R may each form or correspond to a first electrode of a capacitor, the upper insulating layer 215 may form or correspond to a dielectric layer of the capacitor, and the second sensing patterns 227T may each form or correspond to a second electrode of the capacitor. In other words, capacitors forming a fingerprint sensor may be formed in the second substrate 200.

The upper protective layer 219 may be arranged on the top surface of the upper insulating layer 215 to cover the fourth conductive layer (227G and 227T).

The first conductive layer (221B, 221G, 221R, 221T, and 221P) may be on the bottom surface of the lower insulating layer 213. The first conductive layer may include second bonding pads 221B, first-1 sensing pads 221R, first-2 sensing pads 221T, and a first ground pattern 221G to which a reference potential is applied.

The second bonding pads 221B may each be connected to a conductive wire 340 and connected to a first bonding pad 120 of the first substrate 100 through the conductive wire 340. The second bonding pads 221B may include a power pad to which power (e.g., a power supply potential) provided from an external device is applied, a ground pad to which a reference potential is applied, and an output pad which outputs a fingerprint recognition result of the fingerprint sensor package 10 to the outside (e.g., the display 12 of the smart card 1 of FIG. 1). The controller chip 310 may receive the power supply potential through some of the second bonding pads 221B and the power pattern 221P and receive the reference potential through some of the second bonding pads 221B and the first ground pattern 221G. The controller chip 310 may receive signals recognized by the first and second sensing patterns 225R and 227T through the first-1 sensing pads 221R and the first-2 sensing pads 221T.

The first-1 sensing pads 221R may each extend from the first or third contact region CR1 or CR3 to the sensing region SR and overlap the controller chip 310 in the third direction (the Z direction). The first-2 sensing pads 221T may extend from the second contact region CR2 to the sensing region SR and overlap the controller chip 310 in the third direction (the Z direction). The first-1 sensing pads 221R may provide a path for electrical connection between the first sensing patterns 225R and the controller chip 310. The first-2 sensing pads 221T may provide a path for electrical connection between the second sensing patterns 227T and the controller chip 310.

The lower protective layer 217 may be arranged on the bottom surface of the lower insulating layer 213 to cover at least a portion of the first conductive layer (221B, 221G, 221R, 221T, and 221P). In some example embodiments, the lower protective layer 217 may cover a portion of the bottom surface of the lower insulating layer 213. In some example embodiments, the lower protective layer 217 may entirely cover the bottom surface of the lower insulating layer 213.

In some example embodiments, the lower protective layer 217 and the upper protective layer 219 may include a solder resist. In some example embodiments, the lower protective layer 217 and the upper protective layer 219 may include a polymeric material having excellent heat resistance, insulation, and/or mechanical strength. For example, the lower protective layer 217 and the upper protective layer 219 may each include polyimide, polyamide, polyacetal, polycarbonate, and/or the like.

The controller chip 310 and the passive element 320 may be on the bottom surface of the second substrate 200. The controller chip 310 may be mounted on the bottom surface of the second substrate 200 in a flip-chip manner. Connection bumps 315 may be arranged between the controller chip 310 and the second substrate 200 to electrically and physically connect the controller chip 310 to the second substrate 200. The connection bumps 315 may be between some patterns of the first conductive layer (221B, 221G, 221R, 221T, and 221P) and chip pads 311 of the controller chip 310.

In some example embodiments, the controller chip 310 may be arranged entirely or partially in the sensing region SR. In some example embodiments, the controller chip 310 may be arranged entirely outside the sensing region SR. The controller chip 310 may include any components (e.g., a memory chip and/or processor chip) desired to perform an operation of recognizing a user's fingerprint from the change in capacitance values of pixels. The passive element 320 may include, for example, a multi-layer ceramic capacitor (MLCC) but is not limited thereto.

A connection pad 341 may be provided such that the first substrate 100 is attached to the second substrate 200. In some example embodiments, the connection pad 341 may be arranged on the second surface 113 of the core insulating layer 110. In some example embodiments, the connection pad 341 may be arranged around the first bonding pad 120. The second substrate 200 may be attached to the first substrate 100 by the connection pad 341 such that a bottom portion of the second substrate 200 is exposed by the first substrate 100.

The molding layer 350 may be arranged on the first substrate 100 to cover the second substrate 200, the controller chip 310, and the passive element 320. The molding layer 350 may protect the second substrate 200, the controller chip 310, and the passive element 320 from external impact, such as contamination and shock. The molding layer 350 may cover first bonding pads 120 and connection pads 341, which are arranged on the second surface 113 of the core insulating layer 110, but may not cover external connection pads 130 to expose the external connection pads 130. The molding layer 350 may extend on the second surface 113 of the core insulating layer 110 along the boundary between a region in which the first bonding pads 120 and the connection pads 341 are arranged and a region in which the external connection pads 130 are arranged. The molding layer 350 may laterally extend from the side surface of the second substrate 200 to cover the first bonding pads 120 and the connection pads 341 and may be separated from the external connection pads 130.

The molding layer 350 may include an epoxy molding compound. In some example embodiments, the molding layer 350 may include an epoxy-based material, a thermosetting material, a thermoplastic material, or an ultraviolet (UV)-treated material.

Figure 3A:
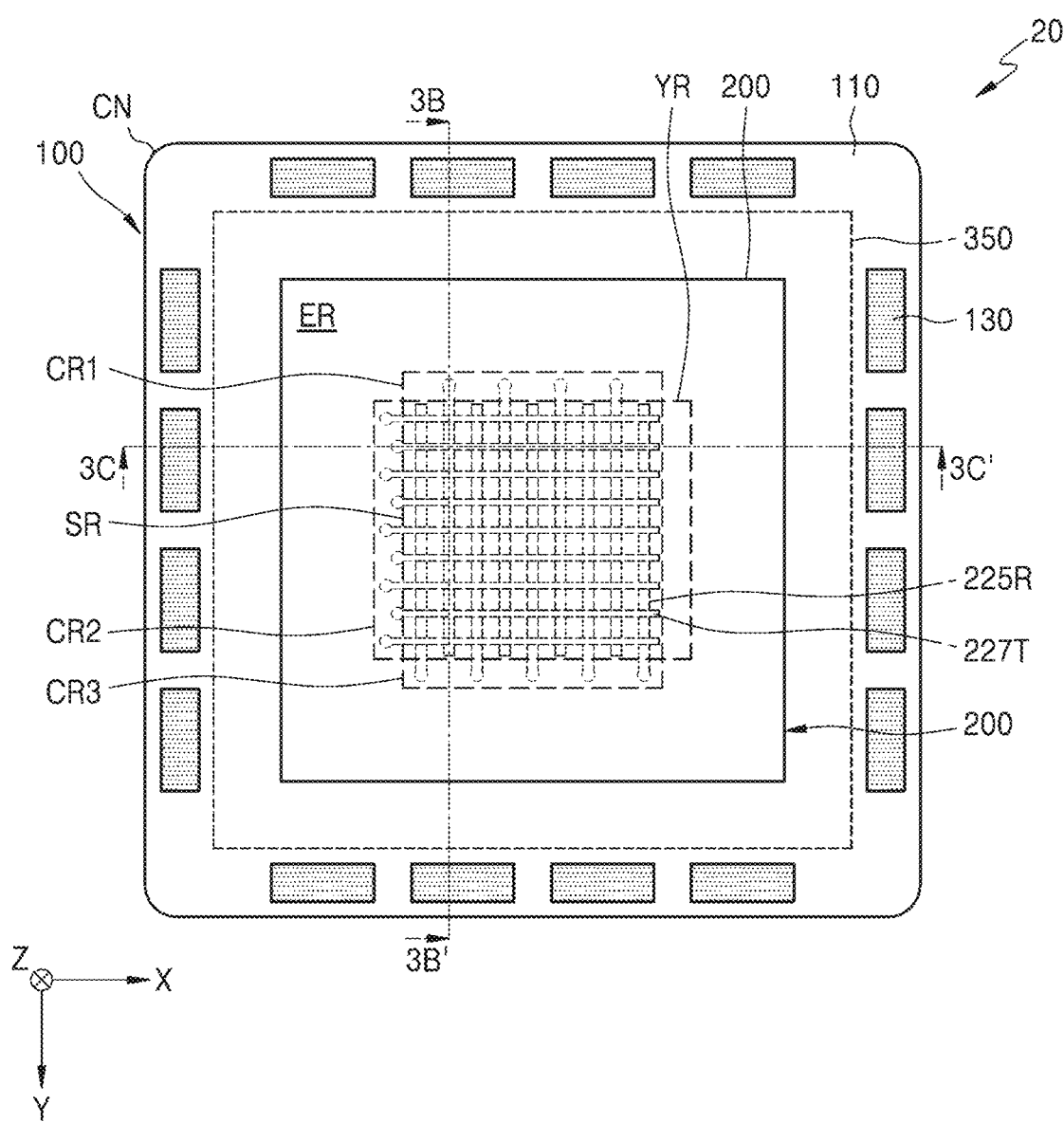
FIG. 3A is a schematic bottom view illustrating a layout according to a partial configuration of a fingerprint sensor package, according to an example embodiment.
Figure 3B:
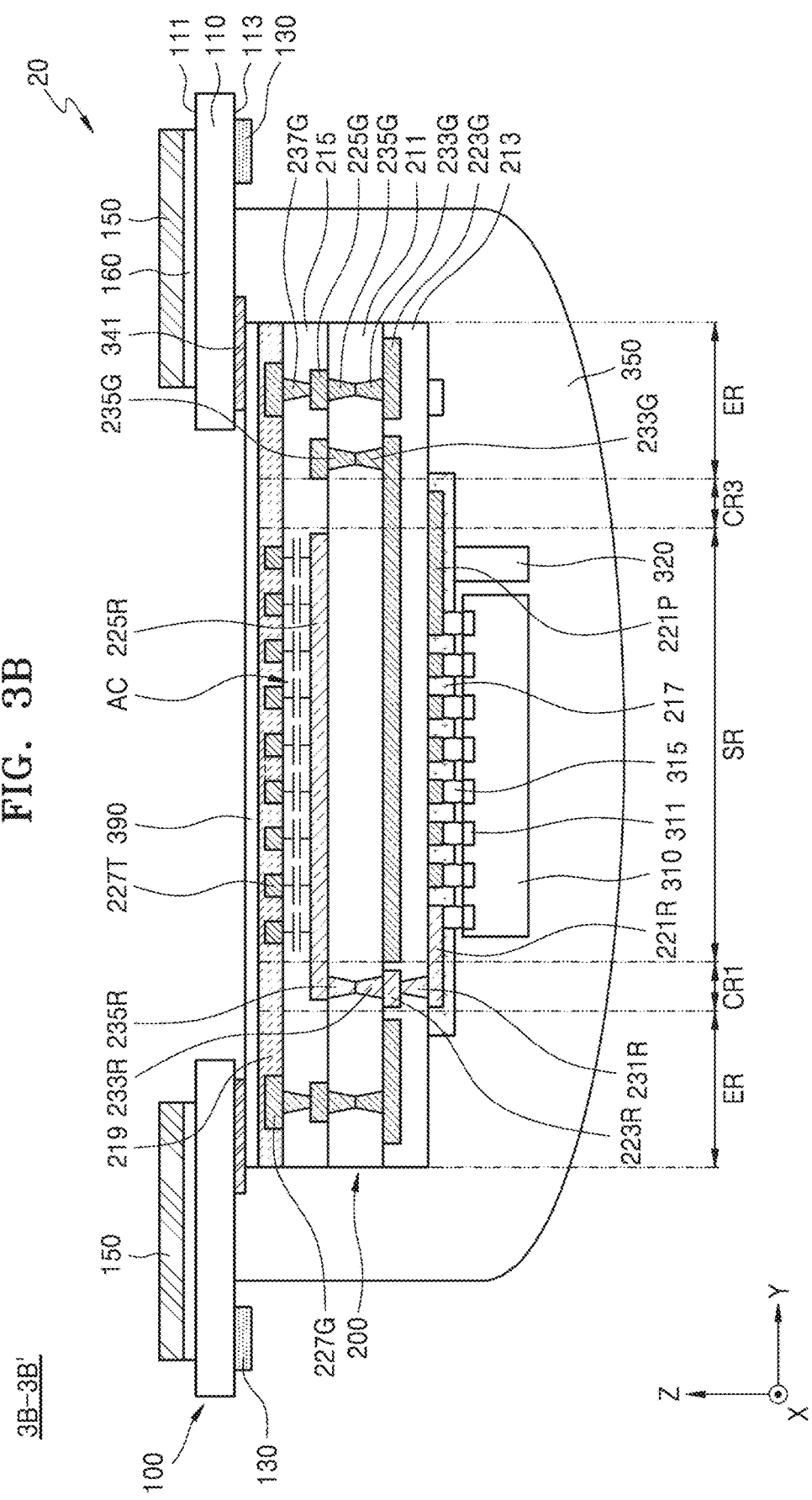
FIG. 3B is a cross-sectional view taken along line 3B-3B' in FIG. 3A.
Figure 3C:
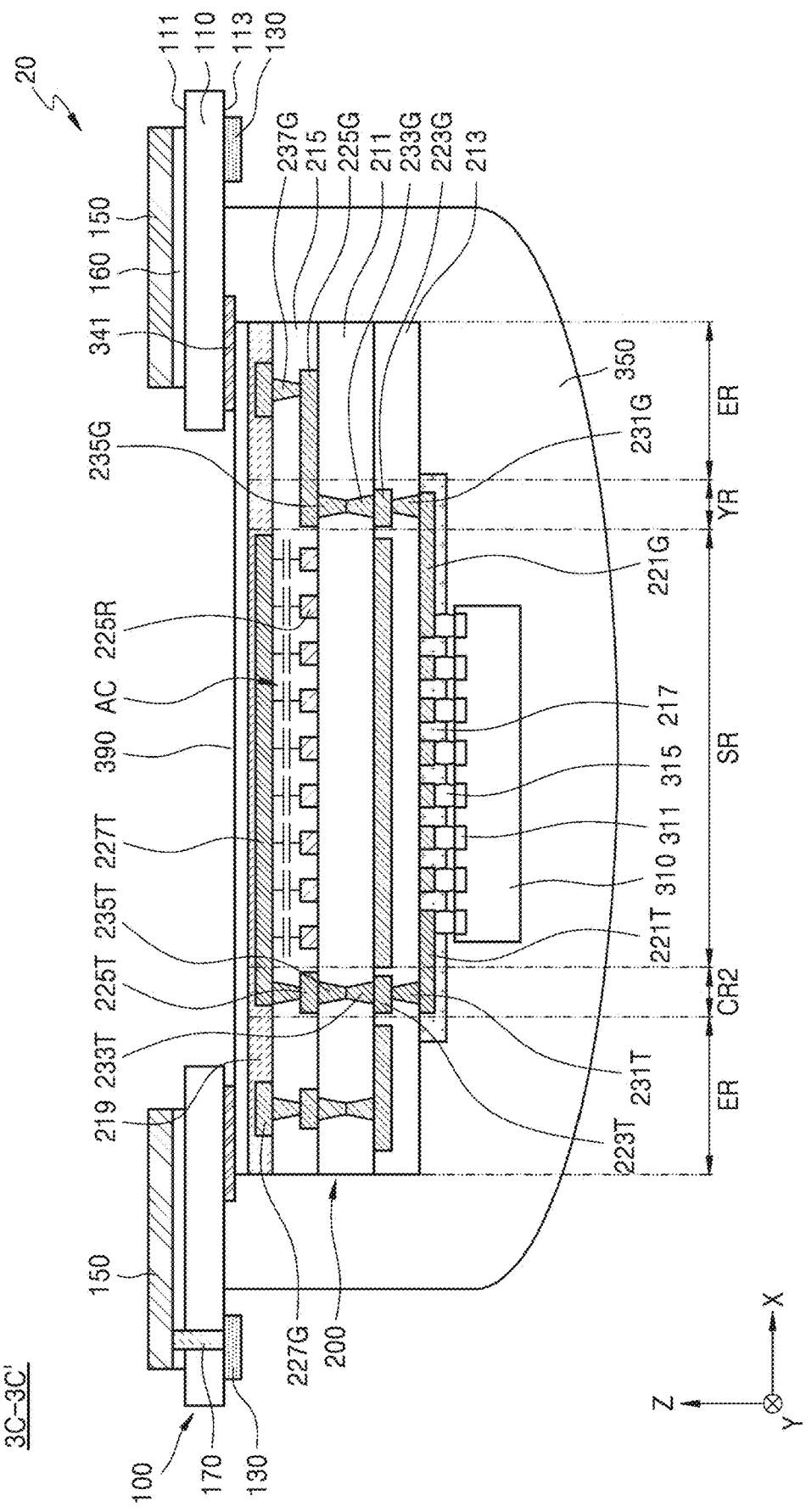
FIG. 3C is a cross-sectional view taken along line 3C-3C' in FIG. 3A.

FIGS. 3A to 3C are diagrams illustrating a fingerprint sensor package 20 according to an example embodiment.

In detail, FIG. 3A is a schematic bottom view illustrating a layout according to a partial configuration of the fingerprint sensor package 20. FIG. 3B is a cross-sectional view taken along line 3B-3B' in FIG. 3A. FIG. 3C is a cross-sectional view taken along line 3C-3C' in FIG. 3A.

When comparing the fingerprint sensor package 20 of FIGS. 3A to 3C with the fingerprint sensor package 10 of FIGS. 2A to 2C, elements indicated by the same reference numerals may be understood as being the same elements. Compared to the fingerprint sensor package 10 of FIGS. 2A to 2C, descriptions of the same elements are omitted, and the fingerprint sensor package 20 is described, focusing on differences from the fingerprint sensor package 10.

Referring to FIGS. 3A to 3C, the fingerprint sensor package 20 may not have a wire bonding structure. In other words, the conductive wires 340 in FIGS. 2A to 2C may not be included in the fingerprint sensor package 20. Accordingly, an element (e.g., a first bonding pad 120 in FIGS. 2A to 2C) which electrically connects the core insulating layer 110 to a conductive wire or an element (e.g., a second bonding pad 221B in FIGS. 2A to 2C) which electrically connects the second substrate 200 to a conductive wire may be omitted.

The fingerprint sensor package 20 may have a structure in which an external connection pad 130 is bonded to a smart card by an anisotropic conductive film. At this time, the anisotropic conductive film may include fine conductive particles therein. When external pressure is applied to the anisotropic conductive film, the fine conductive particles may act as a bridge to conduct electricity. In some example embodiments, the fine conductive particles may have a diameter of about 3 µm to about 15 µm. When the outermost pattern of the external connection pad 130, which is in contact with the anisotropic conductive film, is designed to reduce or prevent the fine conductive particles from escaping to the outside, the fingerprint sensor package 20 may be reliably bonded to a smart card and may also be expected to increase space efficiency. The anisotropic conductive film and the fine conductive particles thereof are described below with reference to FIGS. 5A and 5B.

FIGS. 4A to 4F are diagrams sequentially illustrating a method of manufacturing a smart card, according to an example embodiment. FIGS. 4A to 4F illustrate a method of manufacturing a smart card including the fingerprint sensor package 10 of FIGS. 2A to 2C, but this is just an example. In some example embodiments, a smart card may include the fingerprint sensor package 20 of FIGS. 3A to 3C.

Figure 4A:
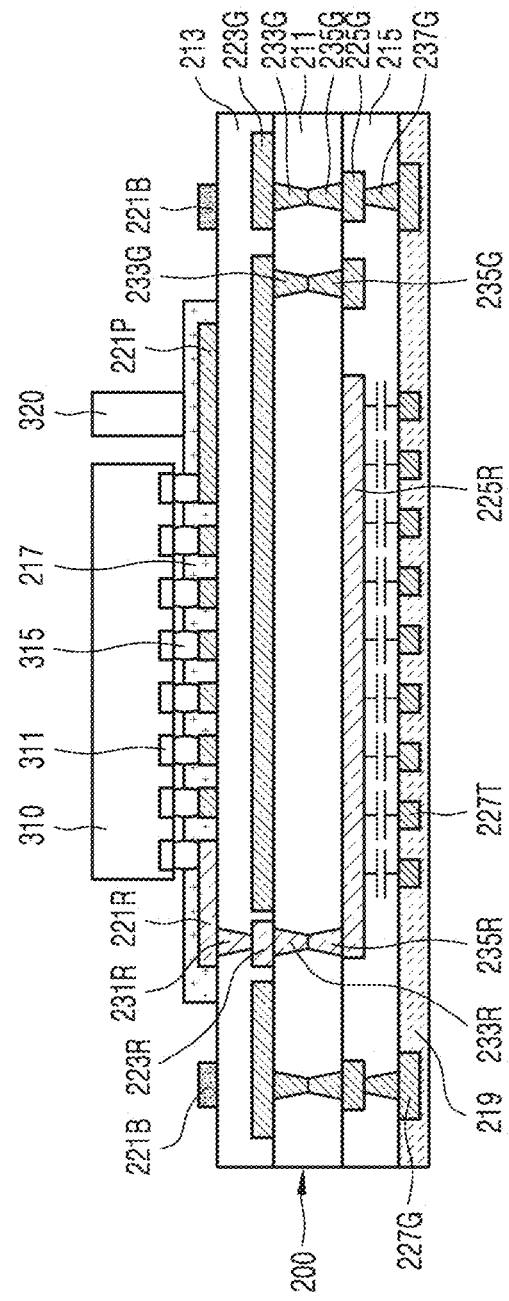
FIGS. 4A to 4F are diagrams sequentially illustrating a method of manufacturing a smart card, according to an example embodiment.

Referring to FIG. 4A, the second substrate 200 may be prepared and the controller chip 310 and the passive element 320 may be mounted on the second substrate 200. The controller chip 310 may be mounted on the second substrate 200 in a flip-chip manner.

Figure 4B:
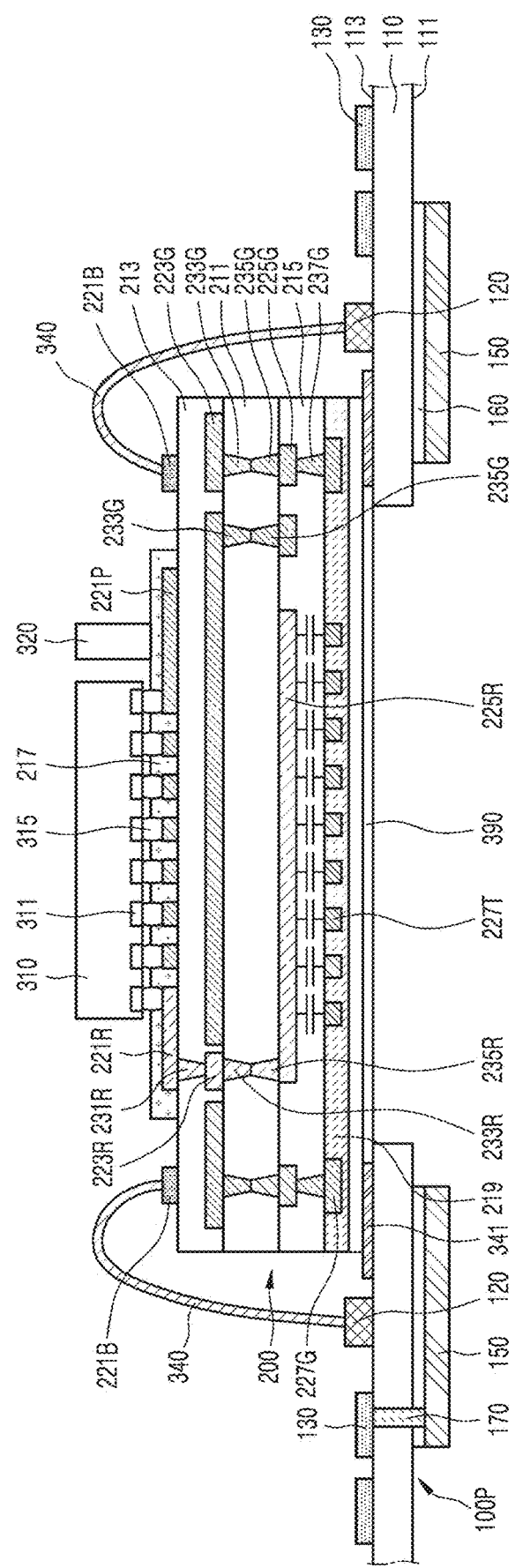

Referring to FIG. 4B, a first panel substrate 100P, on which the second substrate 200 is to be mounted, may be prepared. The elements of the first panel substrate 100P and the materials of the elements are substantially the same as or similar to those of the first substrate 100 of the fingerprint sensor package 10 described above with reference to FIGS. 2A to 2C. However, the first panel substrate 100P may have a larger planar area than the first substrate 100 so that a plurality of second substrates 200 may be mounted on the first panel substrate 100P. The first panel substrate 100P may be mounted on a winding reel (not specifically illustrated). Reeling and releasing of the first panel substrate 100P may be controlled by the winding reel.

The second substrate 200 may be mounted in the mount region of the second surface 113 of the core insulating layer 110 of the first panel substrate 100P. The second substrate 200 may be fixed to the first panel substrate 100P by the substrate adhesive layer 390. A bottom portion of the second substrate 200 may be exposed to the outside.

After the second substrate 200 is mounted on the first panel substrate 100P, a conductive wire 340 may be formed to electrically connect the first panel substrate 100P to the second substrate 200. The conductive wire 340 may extend between a first bonding pad 120 of the first panel substrate 100P and second bonding pad 221B of the second substrate 200. The conductive wire 340 may be formed through a wire bonding process.

Figure 4C:
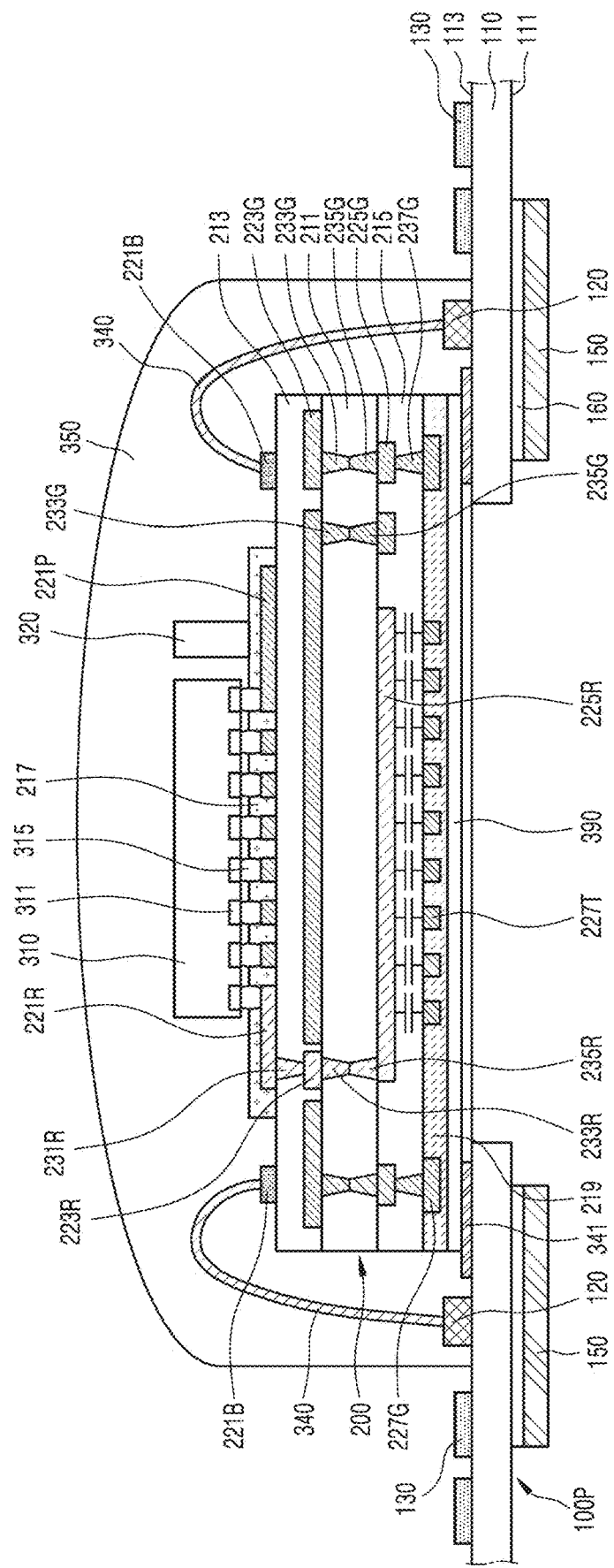

Referring to FIG. 4C, the molding layer 350 may be formed on the second surface 113 of the core insulating layer 110. The molding layer 350 may cover the second substrate 200, the controller chip 310, the passive element 320, and the conductive wire 340. The molding layer 350 may cover the first bonding pad 120 and the connection pads 341 of the first panel substrate 100P but may not cover the external connection pad 130. In other words, the molding layer 350 may laterally extend on the second surface 113 of the core insulating layer 110 from the side surface of the second substrate 200 to the boundary between the first bonding pad 120 and the external connection pad 130.

Figure 4D:
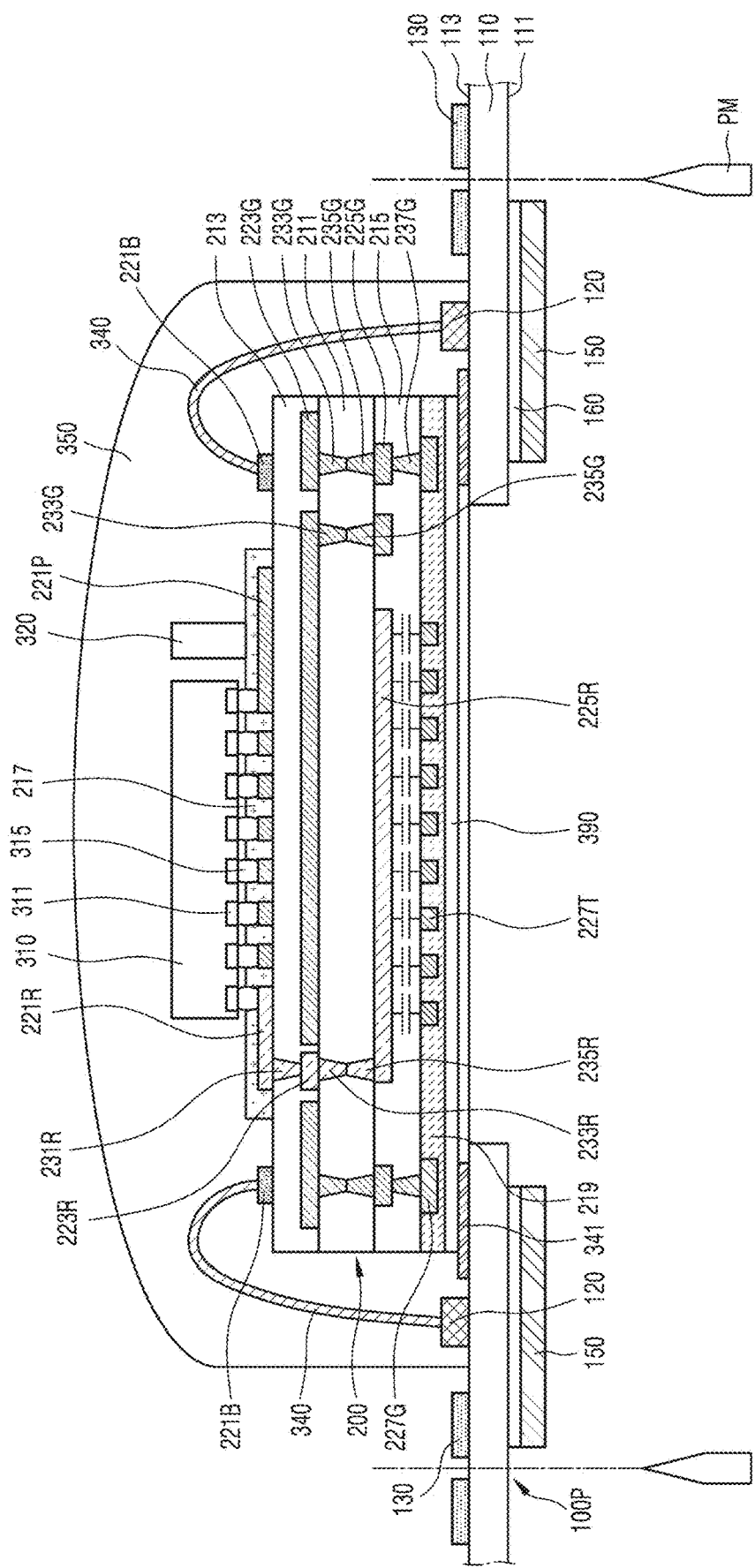

Referring to FIG. 4D, the first panel substrate 100P may be cut using a punching machine PM. The punching machine PM may cut the first panel substrate 100P such that the fingerprint sensor package 10 described with reference to FIGS. 2A to 2C is obtained. As the first panel substrate 100P is cut, a plurality of first substrates 100 (in FIG. 2C) may be obtained. To efficiently reduce or prevent cracks from occurring during the process of cutting the first panel substrate 100P by using the punching machine PM, the punching machine PM may cut the first panel substrate 100P such that the corners of the first substrates 100 have a round shape.

Figure 4E:
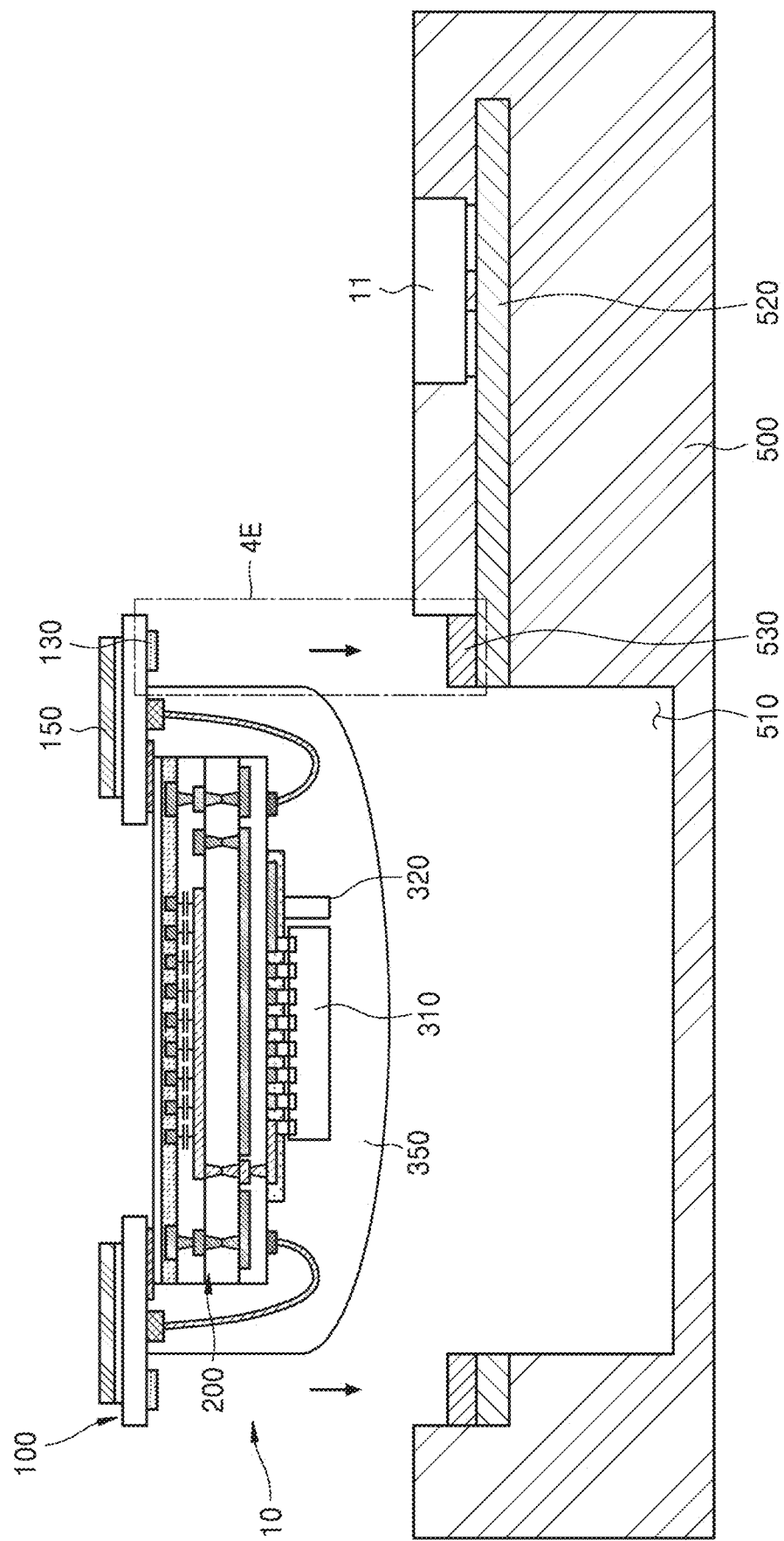

Referring to FIG. 4E, a card body 500 including a card substrate 520, a connection pad 530, and a security chip 11 may be prepared.

The card body 500 may include a groove portion 510 for accommodating the fingerprint sensor package 10. The card substrate 520 and the security chip 11 storing financial information may be arranged in the card body 500. For example, the card substrate 520 may include an FPCB. The security chip 11 may be mounted on the card substrate 520. The security chip 11 may be arranged in the card body 500 such that one surface of the security chip 11 is exposed to the outside. The connection pad 530 may be arranged on the card substrate 520 to electrically connect the fingerprint sensor package 10 to components in the card body 500. The connection pad 530 may include a conductive material. The fingerprint sensor package 10 may be aligned with the groove portion 510 of the card body 500.

Figure 4F:
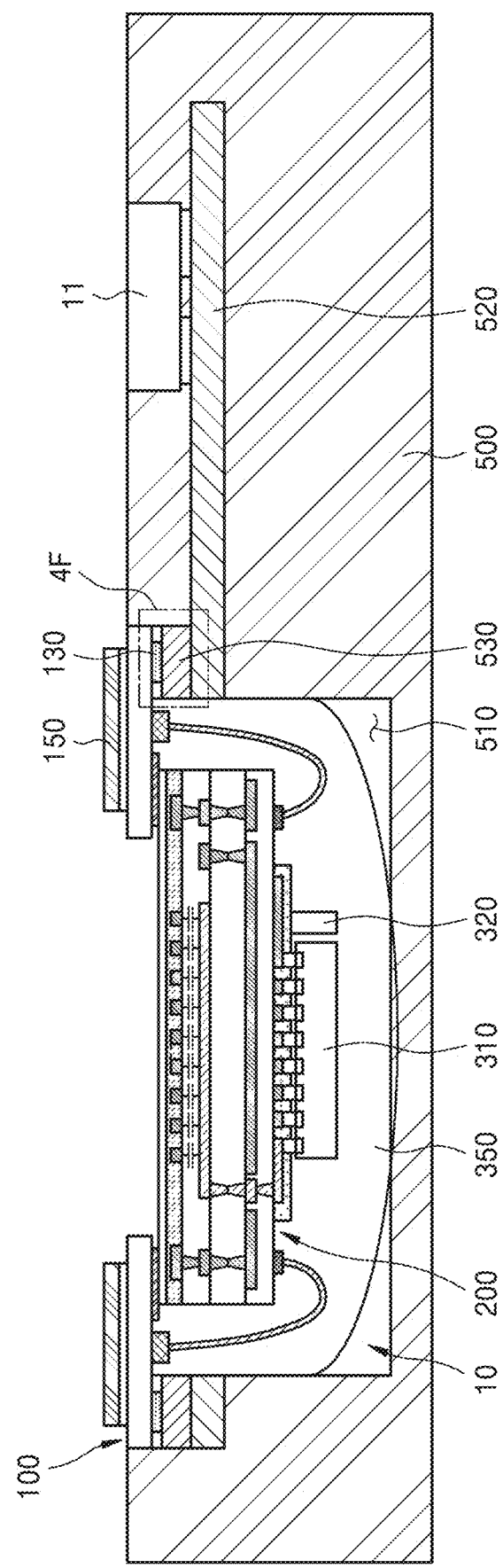

Referring to FIG. 4F, the fingerprint sensor package 10 may be mounted on the card body 500.

A portion of the fingerprint sensor package 10 may be accommodated in the groove portion 510 of the card body 500. The molding layer 350 of the fingerprint sensor package 10 may be accommodated in the groove portion 510. The external connection pad 130 of the first substrate 100 may be bonded to the connection pad 530 of the card substrate 520. The external connection pad 130 of the first substrate 100 may be physically and electrically connected to the connection pad 530 of the card substrate 520. In some example embodiments, the groove portion 510 may not be completely filled with the molding layer 350 of the fingerprint sensor package 10. A flow space may exist between the molding layer 350 of the fingerprint sensor package 10 and the card body 500. The flow space may allow the fingerprint sensor package 10 to flexibly respond to warpage of the smart card 1. In some example embodiments, the flow space may be filled with adhesive.

Referring back to FIG. 1, the smart card 1 may include the fingerprint sensor package 10, the security chip 11, the display 12, and the power button 13. When a user's fingerprint contacts the fingerprint sensor package 10 of the smart card 1, the fingerprint sensor package 10 may recognize the fingerprint. When the recognized fingerprint matches a registered fingerprint, the security chip 11 may grant payment authority to the user of the smart card 1.

Figure 5A:
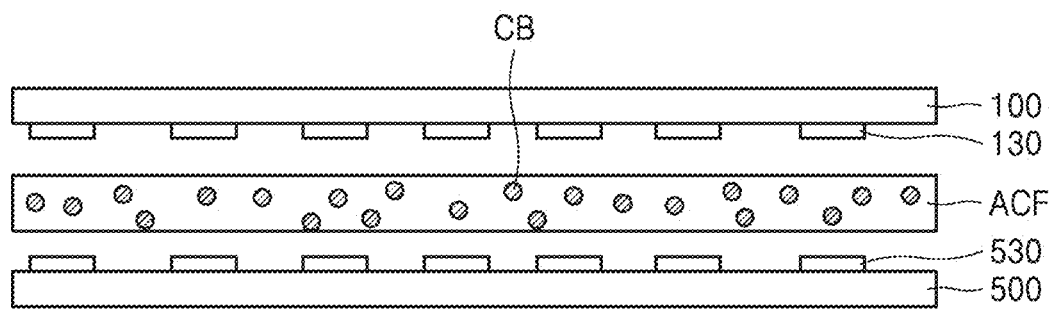
FIG. 5A is a schematic cross-sectional view illustrating core elements in FIG. 4E to explain operating principles of the example embodiment.
Figure 5B:
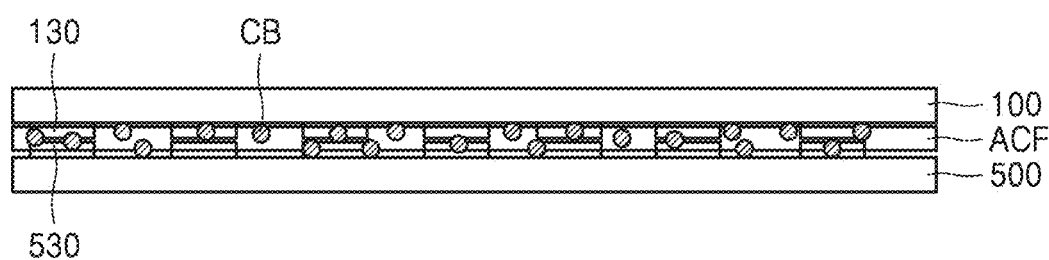
FIG. 5B is a schematic cross-sectional view illustrating core elements in FIG. 4F to explain operating principles of the example embodiment.

FIGS. 5A and 5B are schematic cross-sectional views illustrating core elements in FIGS. 4E and 4F, respectively, to explain operating principles of the inventive concepts. In detail, FIG. 5A is an enlarged view of a region 4E in FIG. 4E and FIG. 5B is an enlarged view of a region 4F in FIG. 4F.

Referring to FIG. 5A, in a state where no pressure is applied to the first substrate, a conductive ball CB may move around without restriction in an anisotropic conductive film ACF. Referring to FIG. 5B, a pressure may be applied by a user to a fingerprint sensor package, and accordingly, the external connection pad 130 of the first substrate 100 may contact the connection pad 530 of the card body 500 with the anisotropic conductive film ACF between the external connection pad 130 and the connection pad 530. At this time, the conductive ball CB may not escape from a pattern formed by the external connection pad 130 through bonding of the fingerprint sensor package to the card body 500 but form a bridge. Accordingly, when the pattern of the external connection pad 130 is designed not to allow the conductive ball CB to escape, a fingerprint sensor package may be reliably bonded to the card body 500 and may increase space efficiency. Examples of patterns that may be formed by the external connection pad 130, according to some example embodiments of the inventive concepts, are described below.

Figure 6A:
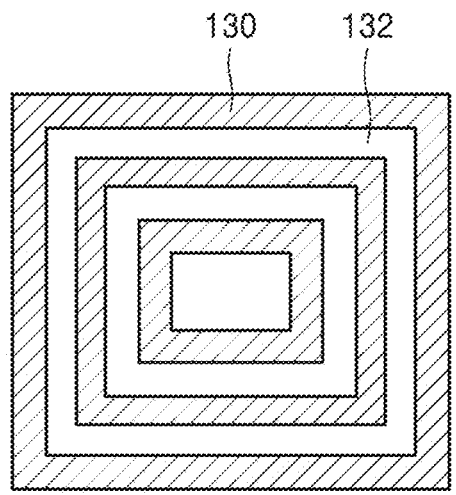
FIGS. 6A to 6C are schematic diagrams showing example patterns of external connection pads, according to some example embodiments.
Figure 6B:
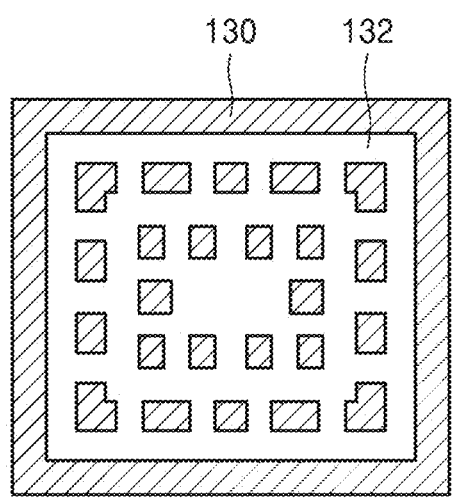
Figure 6C:
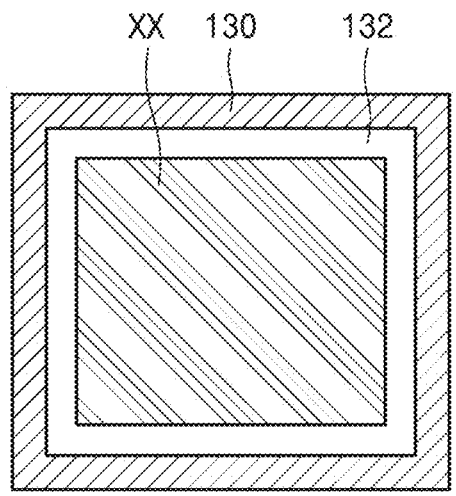

FIGS. 6A to 6C are schematic diagrams showing example patterns of the external connection pad 130, according to some example embodiments.

Referring to FIGS. 6A to 6C, the external connection pad 130 may include an outer pattern in an outer region and an inner pattern inside the outer pattern. In some example embodiments, the outer pattern may have a bar shape in a plan view and an inner pattern inside the bar shape. Further, the outer pattern may have a ring shape. Although it is illustrated in FIGS. 6A to 6C that the outer pattern has a rectangular ring shape, this is just an example. The outer pattern may have a circular ring shape or another polygonal shape according to a plan view. In some example embodiments, the outer pattern may include a plurality of quadrangular shapes arranged apart from each other along an outer edge of the inner pattern, and a distance between the plurality of quadrangular shapes is less than a diameter of a conductive ball (see FIGS. 5A and 5B).

There may be a step between a region of the external connection pad 130 having a pattern formed therein and a region of the external connection pad 130 having no pattern formed therein. The height of the step may be the same as the diameter of a conductive ball (see FIGS. 5A and 5B).

An empty space 132 may be arranged between the outer pattern and the inner pattern. In some example embodiments, the empty space 132 may correspond to an air gap.

Referring to FIG. 6A, the inner pattern may be formed as a pattern of repeatedly disposing smaller rectangular rings within a larger rectangular ring. Referring to FIG. 6B, an inner pattern may have an arrangement in which a plurality of quadrangular shapes are separated from each other by a certain or random distance. However, the arrangement of the inner pattern is not limited thereto. Referring to FIG. 6C, an inner pattern region XX may include any pattern structure that reduces the movement of a conductive ball (see FIGS. 5A and 5B).

Figure 7A:
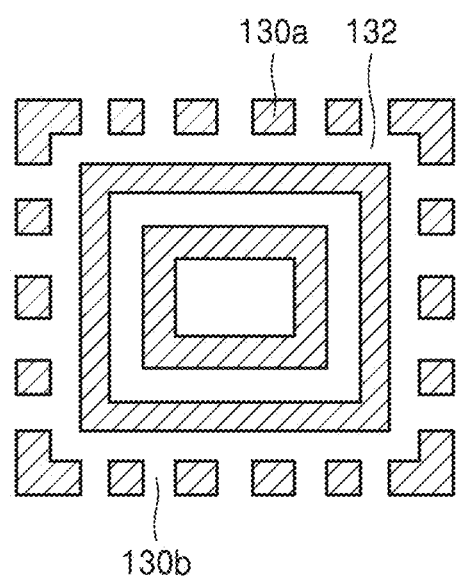
FIGS. 7A to 7C are schematic diagrams showing example patterns of external connection pads, according to some example embodiments.
Figure 7B:
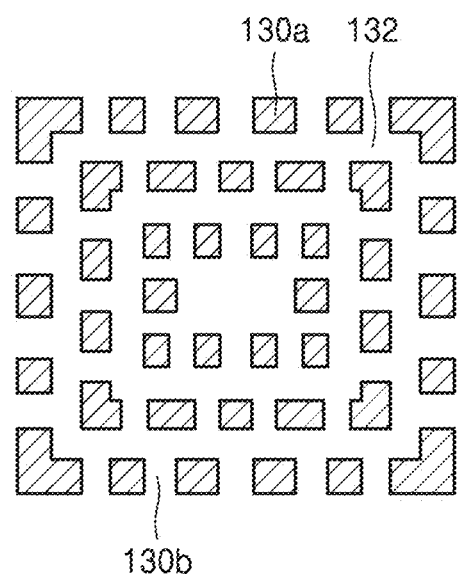
Figure 7C:
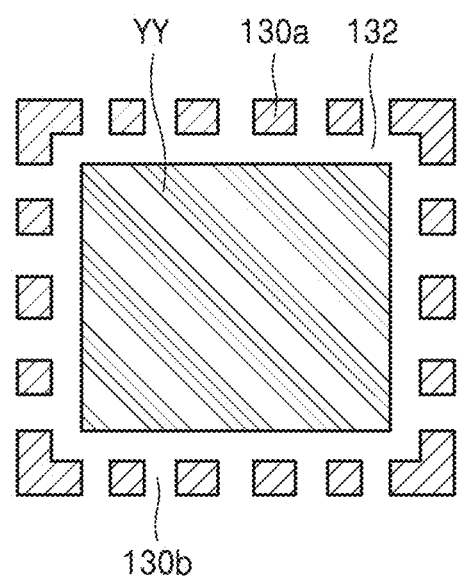

FIGS. 7A to 7C are schematic diagrams showing example patterns of an external connection pad, according to some example embodiments.

Referring to the shape of the external connection pad illustrated in FIGS. 7A to 7C, unlike FIGS. 6A to 6C, an outer pattern 130a is not formed as a closed curve. Spaces 130b may be formed among outer patterns 130a. In some example embodiments, the spaces 130b may be the same size. In some example embodiments, the spaces 130b may have different sizes. The size of the spaces 130b may be less than the size of a conductive ball (see FIGS. 5A and 5B). Accordingly, even though the spaces 130b are arranged among the outer patterns 130a, conductive balls of an anisotropic conductive film may be alleviated or prevented from escaping out of the outer patterns 130a when pressure is applied to the external connection pad.

Referring to FIG. 7A, an inner pattern may be formed as a pattern of repeatedly disposing smaller rectangular rings within a larger rectangular ring in a space surrounded by the outer patterns 130a. Referring to FIG. 7B, an inner pattern may have an arrangement in which a plurality of quadrangular shapes are separated from each other by a certain or random distance. However, the arrangement of the inner pattern is not limited thereto. Referring to FIG. 7C, an inner pattern region YY may include any pattern structure that reduces the movement of a conductive ball (see FIGS. 5A and 5B).

Figure 8:
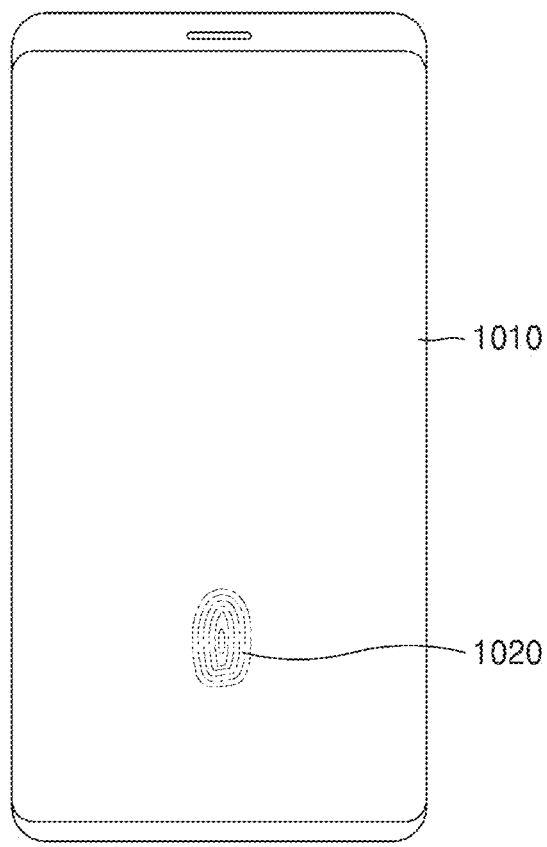
FIG. 8 is a plan view of a mobile device including a fingerprint sensor package, according to an example embodiment.

FIG. 8 is a plan view of a mobile device 1000 including a fingerprint sensor package, according to an example embodiment.

Referring to FIG. 8, the mobile device 1000 may include a display 1010 of a touch screen type and a fingerprint sensor package 1020.

The mobile device 1000 may further include a camera, a speaker, a temperature sensor, a motion sensor, and/or the like. Although a smartphone is shown as an example of the mobile device 1000, example embodiments are not limited thereto. For example, the mobile device 1000 may correspond to a notebook computer, a tablet computer, or a wearable device such as a smart watch, on which the fingerprint sensor package 1020 may be mounted. The fingerprint sensor package 1020 may be arranged in the display 1010 of the mobile device 1000. The fingerprint sensor package 1020 may correspond to any one of the fingerprint sensor packages 10 and 20 described above with reference to FIGS. 2A to 7C.

While the inventive concepts have been particularly shown and described with reference to some example embodiments thereof, it will be understood that various changes in form and details may be made therein without departing from the spirit and scope of the following claims.

What is claimed is:

1. A fingerprint sensor package comprising:
   a first substrate including first bonding pads and an external connection pad;
   a second substrate attached to the first substrate, the second substrate including a plurality of first sensing patterns, a plurality of second sensing patterns, and second bonding pads, the plurality of first sensing patterns being apart from each other in a first direction and each extending in a second direction that crosses the first direction, and the plurality of second sensing patterns being apart from each other in the second direction and each extending in the first direction;
   conductive wires electrically connecting the first bonding pads to the second bonding pads;
   a controller chip connected to the second substrate; and
   a molding layer covering the controller chip and the second substrate and in contact with the first bonding pads, the second bonding pads, and the conductive wires,
   wherein the external connection pad includes an outer pattern having a bar shape in a plan view and an inner pattern inside the bar shape, and the external connection pad is in contact with an anisotropic conductive film including a conductive ball.

2. The fingerprint sensor package of claim 1, wherein a size of a step between the outer pattern and the inner pattern is equal to a diameter of the conductive ball.

3. The fingerprint sensor package of claim 1, wherein a diameter of the conductive ball is about 3 μm to about 15 μm.

4. The fingerprint sensor package of claim 1, further comprising:
an air gap between the outer pattern and the inner pattern.

5. The fingerprint sensor package of claim 1, wherein the outer pattern has a quadrangular ring shape.

6. The fingerprint sensor package of claim 1, wherein the anisotropic conductive film is in contact with the outer pattern.

7. The fingerprint sensor package of claim 1, wherein the second substrate includes:
a sensing region having the plurality of first sensing patterns and the plurality of second sensing patterns arranged therein; and
a peripheral region surrounding the sensing region in a plan view.

8. The fingerprint sensor package of claim 1, wherein
the first substrate further includes a core insulating layer including a first surface and a second surface opposite to the first surface,
the first bonding pads, the external connection pad, and the second substrate are on the second surface of the core insulating layer,
the external connection pad is between an edge of the second surface of the core insulating layer and the first bonding pads, and
the molding layer laterally extends on the second surface of the core insulating layer from a side surface of the second substrate to a boundary between the first bonding pads and the external connection pad.

9. The fingerprint sensor package of claim 8, wherein
the second substrate includes,
a sensing region having the plurality of first sensing patterns and the plurality of second sensing patterns arranged therein, and
a peripheral region surrounding the sensing region in a plan view, and
the first substrate further includes,
a ground bezel on the first surface of the core insulating layer, and
an adhesive layer between the ground bezel and the core insulating layer.

10. The fingerprint sensor package of claim 1, further comprising:
a substrate adhesive layer between a top surface of the second substrate and the first substrate,
wherein the controller chip is on a bottom surface of the second substrate.

11. A fingerprint sensor package comprising:
a first substrate including a core insulating layer including a first surface and a second surface opposite to the first surface, a ground bezel on the first surface of the core insulating layer, an adhesive layer between the core insulating layer and the ground bezel, first bonding pads on the second surface of the core insulating layer, and an external connection pad between an edge of the second surface of the core insulating layer and the first bonding pads;
a second substrate attached to the second surface of the core insulating layer, the second substrate including a plurality of first sensing patterns, a plurality of second sensing patterns, and second bonding pads, the plurality of first sensing patterns being apart from each other in a first direction and each extending in a second direction that crosses the first direction, and the plurality of second sensing patterns being apart from each other in the second direction and each extending in the first direction;
conductive wires electrically connecting the first bonding pads to the second bonding pads;
a controller chip connected to the second substrate; and
a molding layer covering the second substrate and the controller chip and in contact with the first bonding pads, the second bonding pads, and the conductive wires,
wherein the molding layer laterally extends on the second surface of the core insulating layer from a side surface of the second substrate to a boundary between the first bonding pads and the external connection pad,
the plurality of first sensing patterns are apart from the plurality of second sensing patterns in a third direction that is perpendicular to the first direction and the second direction, the plurality of first sensing patterns and the plurality of second sensing patterns form a plurality of capacitors, and
the external connection pad includes an outer pattern and an inner pattern and is in contact with an anisotropic conductive film including a conductive ball.

12. The fingerprint sensor package of claim 11, wherein the outer pattern includes a plurality of quadrangular shapes arranged apart from each other along an outer edge of the inner pattern.

13. The fingerprint sensor package of claim 12, wherein a distance between the plurality of quadrangular shapes is less than a diameter of the conductive ball.

14. The fingerprint sensor package of claim 11, wherein a size of a step between the outer pattern and the inner pattern is equal to a diameter of the conductive ball.

15. The fingerprint sensor package of claim 14, wherein the diameter of the conductive ball is about 3 μm to about 15 μm.

16. The fingerprint sensor package of claim 11, wherein the anisotropic conductive film is in contact with the outer pattern.

17. A smart card comprising:
a card body including a groove portion and a connection pad;
a security chip in the card body; and
a fingerprint sensor package configured to sense a user's fingerprint and transmit a signal corresponding to a sensing result to the security chip,
wherein the fingerprint sensor package includes,
a first substrate including a core insulating layer including a first surface and a second surface opposite to the first surface, first bonding pads on the second surface of the core insulating layer, and an external connection pad bonded to the connection pad of the card body,
a second substrate attached to the second surface of the core insulating layer, the second substrate including a plurality of first sensing patterns, a plurality of second sensing patterns, and second bonding pads, the plurality of first sensing patterns being apart from each other in a first direction and each extending in a second direction that crosses the first direction, and the plurality of second sensing patterns being apart from each other in the second direction and each extending in the first direction, conductive wires extending between the first bonding pads and the second bonding pads, a controller chip connected to the second substrate, and a molding layer covering the second substrate and the controller chip and in contact with the first bonding pads, the second bonding pads, and the conductive wires, and wherein the external connection pad includes an outer pattern and an inner pattern and is in contact with an anisotropic conductive film including a conductive ball.

18. The smart card of claim 17, wherein a diameter of the conductive ball is about 3 μm to about 15 μm, a size of a step between the outer pattern and the inner pattern is equal to the diameter of the conductive ball, and the anisotropic conductive film is in contact with the outer pattern.

19. The smart card of claim 17, wherein the outer pattern has a ring shape surrounding an outer edge of the inner pattern.

20. The smart card of claim 17, wherein the outer pattern includes a plurality of quadrangular shapes arranged apart from each other along an outer edge of the inner pattern, and a distance between the plurality of quadrangular shapes is less than a diameter of the conductive ball.

* * * * *